United States Patent
Deines

[15] 3,702,051
[45] Nov. 7, 1972

[54] INDEPENDENTLY OPERABLE DUAL DRIVE WHEEL RIDING POWER MOWER

[72] Inventor: John Deines, P. O. Box 207, Ransom, Kans. 67572

[22] Filed: Sept. 8, 1970

[21] Appl. No.: 70,227

[52] U.S. Cl. ..................56/11.3, 56/11.8, 56/15.9
[51] Int. Cl. ..............................................A01d 35/26
[58] Field of Search..................56/11.3, 11.5–11.6, 56/11.7, 11.8, 14.9–15.2, 15.8, 15.9, 16.3, 16.7, 16.2; 180/6.48

[56] References Cited

UNITED STATES PATENTS

| | | | |
|---|---|---|---|
| 3,459,273 | 8/1969 | Leinhauser et al. | 180/6.48 |
| 2,359,758 | 10/1944 | Hamren | 180/6.48 |
| 3,263,406 | 8/1966 | Hanson et al. | 56/11.6 |
| 3,452,530 | 7/1969 | Kulak | 56/6 X |
| 2,483,683 | 10/1949 | Wells et al. | 56/16.3 |
| 2,674,837 | 4/1954 | Buck | 56/11.8 |
| 2,991,612 | 7/1961 | Holmes | 56/6 X |
| 2,285,306 | 6/1942 | Roseman | 56/7 |
| 2,909,882 | 10/1959 | Lewis | 56/7 |

Primary Examiner—Louis G. Mancene
Assistant Examiner—J. N. Eskovitz
Attorney—Keith Misegades and George R. Douglas, Jr.

[57] ABSTRACT

A riding power mower having a front mounted rotary power mower assembly thereon and further comprising a frame, a motor mounted on the frame, a pair of forward drive wheels each independently driven from the motor through separate transmissions, and a single, trailing support wheel, freely pivotally mounted on a vertical axis.

3 Claims, 6 Drawing Figures

INVENTOR
JOHN DEINES

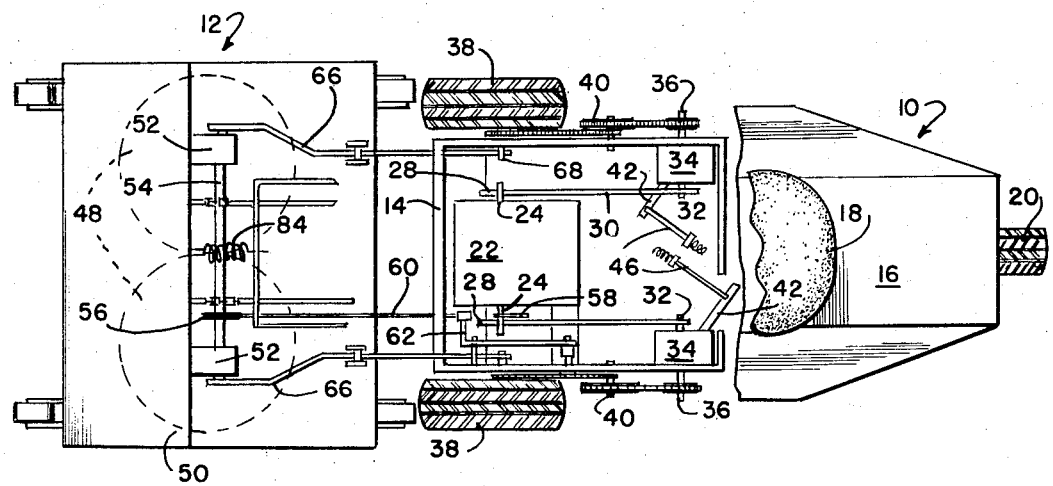

INDEPENDENTLY OPERABLE DUAL DRIVE WHEEL RIDING POWER MOWER

BACKGROUND OF THE INVENTION

Riding power mowers are not new. Such devices permit the operator to sit down in comfort while moving relatively large lawns.

One of the primary objects of this invention is to reduce the cost and maintenance problems of such power mowers. For these reasons, drive and steering are provided by single controls without the need of a separate rotating steering column and attendant gearbox. At the same time, the mower may be large enough to include two rotating blades so that a wide swath may be cut. Independent controls are provided for driving the mower blades and for lifting the mower assembly out of contact with the ground, to a non-operative position.

The prior art includes several relevant patents. U.S. Pat. No. 2,688,833 issued to Herbert F. Weiss et al, discloses a tractor mounted rotary power mower attachment driven from the tractor PTO and including two mower blades. To use the invention, one first needs a tractor. The other end of the extremes is indicated by U.S. Pat. No. 2,705,393, issued to Virgil Cofer, which illustrates a tricycle frame with an engine on the rear and a rotary cutter mounted beneath the frame, between the front and rear wheels. Steering and drive controls are independent. An interesting departure in the art is shown in U.S. Pat. No. 2,919,756, issued to Earl A. Knipe, wherein a riding cart is pulled by a mower having the motor thereon. Six wheels are required and steering and drive controls are independent. Separate driving and steering controls are indicated in U.S. Pat. No. 3,015,237, issued to Orly Musgrave; the power mower with its cowling is rigidly attached to the frame. Combined driving and steering controls are disclosed in U.S. Pat. No. 3,123,961, issued to Igor Kamlukin, wherein a joy stick is employed, laterally movable to steer, and rockable parallel to the path of travel to engage the clutch of the invention.

The instant invention provides a dual stick arrangement for driving and steering so that only a single pair of wheels are required to effect drive and direction. A separate control operates the power mower itself, and a fourth lever control moves the power mower assembly into and out of an operative, cutting position.

SUMMARY OF THE INVENTION

A riding power mower comprising a frame, an engine mounted on the frame, dual drive shafts from the engine to a pair of independently operable transmissions, and a pair of ground engaging wheels, one to each transmission. There are control means for each transmission to effect independent drive of the wheels, thereby allowing movement and steering of the mower through independent drive of the ground engaging wheels. A separate control is provided to selectively drive the mower assembly, and a fourth, manually operable control permits lowering of the mower assembly to a ground-engaging, cutting position, and for raising of the mower to a non-operating position.

BRIEF DESCRIPTION OF THE DRAWINGS

Further and more complete understanding of the instant invention may be had by reference to the following specification and drawings wherein:

FIG. 2 is a top plan view of the invention as shown in FIG. 1, but drawn to a larger scale, with the deck and seat removed to show interior parts;

FIG. 3 is a front view of the invention as illustrated in FIG. 2;

FIG. 4 is a side elevational view of the invention;

DESCRIPTION OF THE PREFERRED EMBODIMENTS

Figure 1:
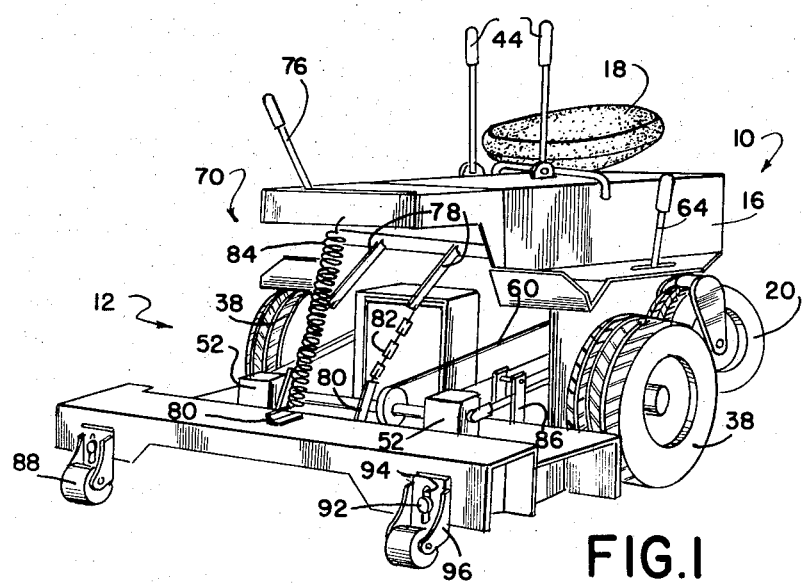
FIG. 1 is a perspective view of the invention.

Referring now to the drawings by reference character, the invention is illustrated comprising, basically, a tractor unit 10 with a mower assembly 12 mounted forwardly thereof. Tractor 10 includes a base frame 14 with a deck 16 thereon, with a seat 18 for the operator of the invention, and a caster wheel 20 at the rear, freely rotatable about a vertical axis. Preferably, the frame is formed of the usual channel members and the deck stamped from sheet steel, although plastic or other suitable material can be used for the deck.

The novel drive train of the mower begins with a power plant 22 having two drive or output shafts 24. Usually, the power plant 22 would be an internal combustion engine (thus, the reason for an air cleaner 26), but any suitable prime mover may be used. For example, a rechargeable electric power plant may be employed. Shafts 24, 24 include pulleys 28, 28 having V-drive belts 30, 30 which are secured about input pulleys and shafts 32, 32 of a pair of transmissions 34, 34. Output shafts 36, 36 of each transmission are drivingly connected to wheels 38, 38 through chain and sprocket drive assemblies 40, 40. As in the case of power plant 22, the precise construction of each transmission 34, 34 forms no part of the instant invention. However, in the preferred embodiment, they are of the hydrostatic variety, each controlled by a lever 42 which is moved from a handle 44 on deck 16 through a bowdin wire connector, partially indicated at 46 (FIG. 2). Such a transmission currently available is manufactured by Eaton, Yale & Towne, Inc., catalog part no. ET-11559-2. Each lever 42 has three positions: forward, neutral and reverse. Thus, once power plant 22 is operating, each drive wheel 38 may be independently or simultaneously driven merely by shifting handles 44 separately or together. Since rear caster wheel 42 is free to rotate about a vertical axis, movement of one wheel 38 while the other wheel 38 is not driven, or is driven in an opposite direction, effects steering of the tractor vehicle. Additionally, with wheels 38 serving the purposes of propulsion as well as steering, the invention may be turned around in an extremely tight arc or "on a dime" as it were, which is an important attribute when mowing in tight corners, around trees and shrubbery, and so forth.

Mower assembly 12 includes the usual rotary mower blades, the swath thereof being indicated by dot and dash lines 48 in FIG. 2, encased in a mower deck 50. The mower blades are drivingly connected to power plant 22 through a pair of gear boxes 52, 52 on top of mower deck 50, connected together by a secondary lateral drive shaft 54 which has a pulley 56 thereon connected to a pulley 58 on one output shaft 24 of power plant 22 by a V-drive belt 60. For selective drive of the mower blades, V-belt 60 is loosely trained about pulleys 56 and 58 and is pressed into engagement therewith by an idler wheel assembly 62 operable from control handle 64, situated near the operator in deck 16 (FIG. 4).

Mower assembly 12 is secured to tractor 10 by a pair of support arms 66, which are arcuately movable to the internal free ends of stub axles 68, 68, for each wheel 38, 38, so that the mower assembly 12 may be lifted from contact with the ground to a non-operable position by a lift mechanism 70, 70. It should be noted that the axis of pivoting for arms 66 is coincident with output shafts 24, 24 of power plant 22. Thus, tension on mower blade V-belt 60 comprises the same whether mower assembly 12 is in contact with the ground or raised to a non-operating position.

The lift mechanism 70 comprises a platform 72 through which a rotatable bar 74 is journalled, having a control lever including a handle 76 with lift arms 78, 78, each attached to a lug 80 on mower deck 50 by a flexible connector such as chain 82. The weight of the mower assembly 12 may be counter-balanced by a suitable spring 84. A pair of V-shaped lift guides 86, 86 are provided on the rear of mower deck 50 which engage support arms 66, 66 as handle 76 is rotated to the position. In this way, the rear portion of mower deck 50 is raised from the ground.

Figure 5:
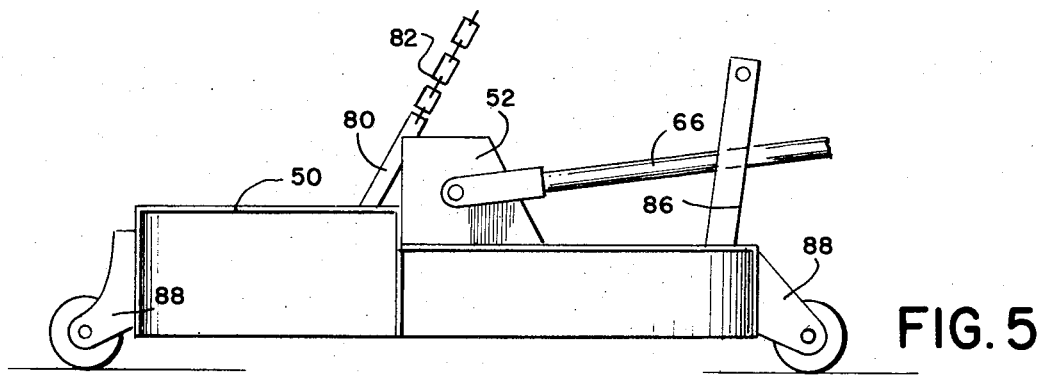
FIG. 5 is a partial side view of the invention showing one embodiment for mounting the mower assembly.
Figure 6:
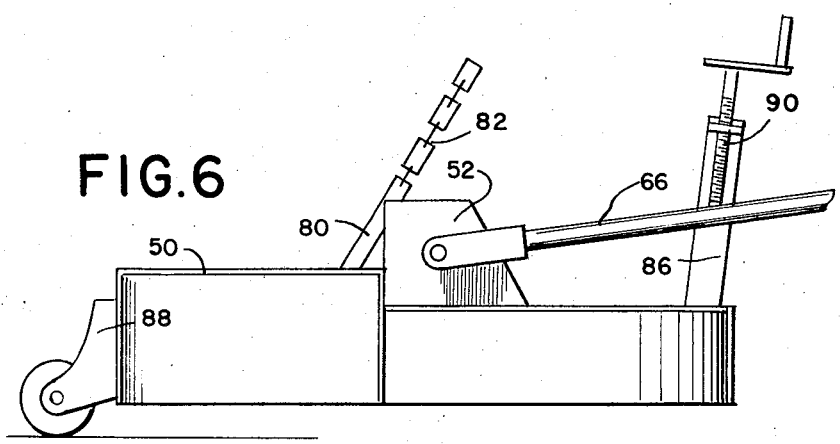
FIG. 6 is another partial side view of the invention illustrating a second embodiment for mounting the mower assembly.

In a preferred embodiment, four casters 88, 88, 88, 88 support mower deck 50 as it rides over the ground, as illustrated in FIG. 5. In another embodiment, shown in FIG. 6, only a pair of forward casters 88, 88 are provided, the rear of mower deck 50 being maintained above the ground by control rods 90, 90 threaded through lift guides 86, 86. The height of the rear of mower deck 50 may be controlled by rods 90, 90, which constantly bear against support arms 66, 66. As in the embodiment shown in FIG. 6, the rear of deck 50 is lifted when handle 76 is rotated to the upward position (FIG. 4) by reason of arms 66, 66 bearing against rods 90, 90. Also in each embodiment, each caster wheel 88, 88 is vertically adjustable to raise and lower mower deck 50 by means of a bolt 92 threaded to deck 50 through a mounting slot 94 formed in caster wheel support 96 (FIG. 1).

I claim:

1. A tractor having a forwardly mounted mower assembly comprising:
    a. a central frame;
    b. a motor mounted on the frame and including a pair of drive shafts extending therefrom;
    c. a pair of transmissions, one for each drive shaft, driven thereby, each transmission having control means to selectively drive an output shaft thereon;
    d. a pair of ground engaging wheels, one for each transmission, and each including drive means connected to its output shaft; and
    e. at least one freely rotatable ground engaging caster, additionally freely mounted for rotation about a vertical axis;

wherein each transmission is a hydrostatic transmission, having a control lever thereon defining forward, reverse and neutral positions, said lever operable through a flexible connection; wherein said mower is drivingly connected to said motor through a drive train comprising:
    a. a gear box above the mower blade mounting;
    b. a drive shaft extending from the gear box;
    c. power transmission means connecting the gear box drive shaft to one of the motor drive shafts.
    d. an idler means to tension the drive belt over pulleys to drive, the mower blade;

wherein the mower assembly comprises:
    a. a mower deck, enshrouding said rotary mower blade;
    b. a pair of support arms extending from the tractor to the mower deck, and rotatably secured to the tractor; and
    c. lift means on the tractor above the mower deck, for raising the mower deck to a non-operative position;

wherein said mower deck lift means comprises:
    a. a platform extending over the mower deck;
    b. a control bar journalled in the platform;
    c. a handle mounted on the bar;
    d. lift arm means on the bar having flexible connectors secured to the mower deck; and
    e. a pair of lift guides one over each support arm; whereupon rotation of said lift means handle, said mower deck is raised by the lift arm means and the support arms bearing against the support arms;

whereby said tractor may be steered through independent actuation of said ground engaging wheels through independent operation of said transmission control means, and driven through simultaneous actuation of said ground engaging wheels through simultaneous operation of said transmission control means.

2. The invention as recited in claim 1 wherein said mower deck is supported by wheels, each individually vertically adjustable to selectively position the mower deck on a riding surface.

3. The invention as recited in claim 1 wherein said mower deck is supported by two wheels mounted forwardly on the deck, each individually vertically adjustable to selectively position the mower deck on a riding surface, said V-shaped lift guides each including a control rod threaded therethrough and bearing against said support arms, and rotatable to selectively position the rear portion of said mower deck, vertically with respect to a riding surface.

* * * * *